United States Patent
Tadano et al.

(10) Patent No.: US 12,401,882 B2
(45) Date of Patent: Aug. 26, 2025

(54) ELECTRONIC APPARATUS AND IMAGING SYSTEM

(71) Applicant: Sony Group Corporation, Tokyo (JP)

(72) Inventors: Ryuichi Tadano, Kanagawa (JP); Yoto Komoriya, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 146 days.

(21) Appl. No.: 17/440,334

(22) PCT Filed: Feb. 20, 2020

(86) PCT No.: PCT/JP2020/006669
§ 371 (c)(1),
(2) Date: Sep. 17, 2021

(87) PCT Pub. No.: WO2020/202870
PCT Pub. Date: Oct. 8, 2020

(65) Prior Publication Data
US 2022/0150401 A1  May 12, 2022

(30) Foreign Application Priority Data
Mar. 29, 2019 (JP) .................. 2019-068358

(51) Int. Cl.
*H04N 23/611* (2023.01)
*G06V 40/20* (2022.01)
*H04N 23/68* (2023.01)
*H04N 23/698* (2023.01)

(52) U.S. Cl.
CPC .......... *H04N 23/611* (2023.01); *G06V 40/20* (2022.01); *H04N 23/6811* (2023.01); *H04N 23/683* (2023.01); *H04N 23/698* (2023.01)

(58) Field of Classification Search
None
See application file for complete search history.

(56) References Cited

U.S. PATENT DOCUMENTS

| | | | |
|---|---|---|---|
| 2004/0101178 A1* | 5/2004 | Fedorovskaya | H04N 1/32 382/128 |
| 2008/0129839 A1 | 6/2008 | Asukai | |
| 2009/0115892 A1* | 5/2009 | Sako | H04N 23/62 348/376 |

(Continued)

FOREIGN PATENT DOCUMENTS

| | | |
|---|---|---|
| CN | 1905629 A | 1/2007 |
| CN | 101179712 A | 5/2008 |

(Continued)

OTHER PUBLICATIONS

International Search Report (PCT/ISA/210), International Application No. PCT/JP2020/006669, dated Mar. 17, 2020.

*Primary Examiner* — Eileen M Adams
(74) *Attorney, Agent, or Firm* — Michael Best & Friedrich LLP

(57) ABSTRACT

An electronic apparatus according to an embodiment of the disclosure includes: an imaging section that acquires imaging data; a data generator that generates emotion data on a basis of acquisition data; a data processor that associates the imaging data and the emotion data with each other in chronological order; and a controller that causes a setting of the imaging section to be changed in chronological order on a basis of the emotion data.

19 Claims, 19 Drawing Sheets

(56) References Cited

U.S. PATENT DOCUMENTS

| | | | | |
|---|---|---|---|---|
| 2015/0341590 A1* | 11/2015 | Choe | .................... | H04N 23/632 |
| | | | | 348/207.1 |
| 2017/0274822 A1* | 9/2017 | Haggerty | .................. | B60R 1/27 |
| 2017/0278271 A1 | 9/2017 | Nonaka | | |
| 2018/0165863 A1* | 6/2018 | Kubo | ...................... | A63F 13/25 |
| 2018/0249056 A1 | 8/2018 | Chi | | |

FOREIGN PATENT DOCUMENTS

| | | | |
|---|---|---|---|
| CN | 102547087 | A | 7/2012 |
| CN | 103139473 | A | 6/2013 |
| JP | 2000285221 | A | 10/2000 |
| JP | 2001100888 | A | 4/2001 |
| JP | 2007-128266 | A | 5/2007 |
| JP | 2008-118527 | A | 5/2008 |
| JP | 2008-124885 | A | 5/2008 |
| JP | 2009-081784 | A | 4/2009 |
| JP | 2014192755 | A | 10/2014 |
| JP | 2018-151660 | A | 9/2018 |

\* cited by examiner

[ FIG. 1 ]
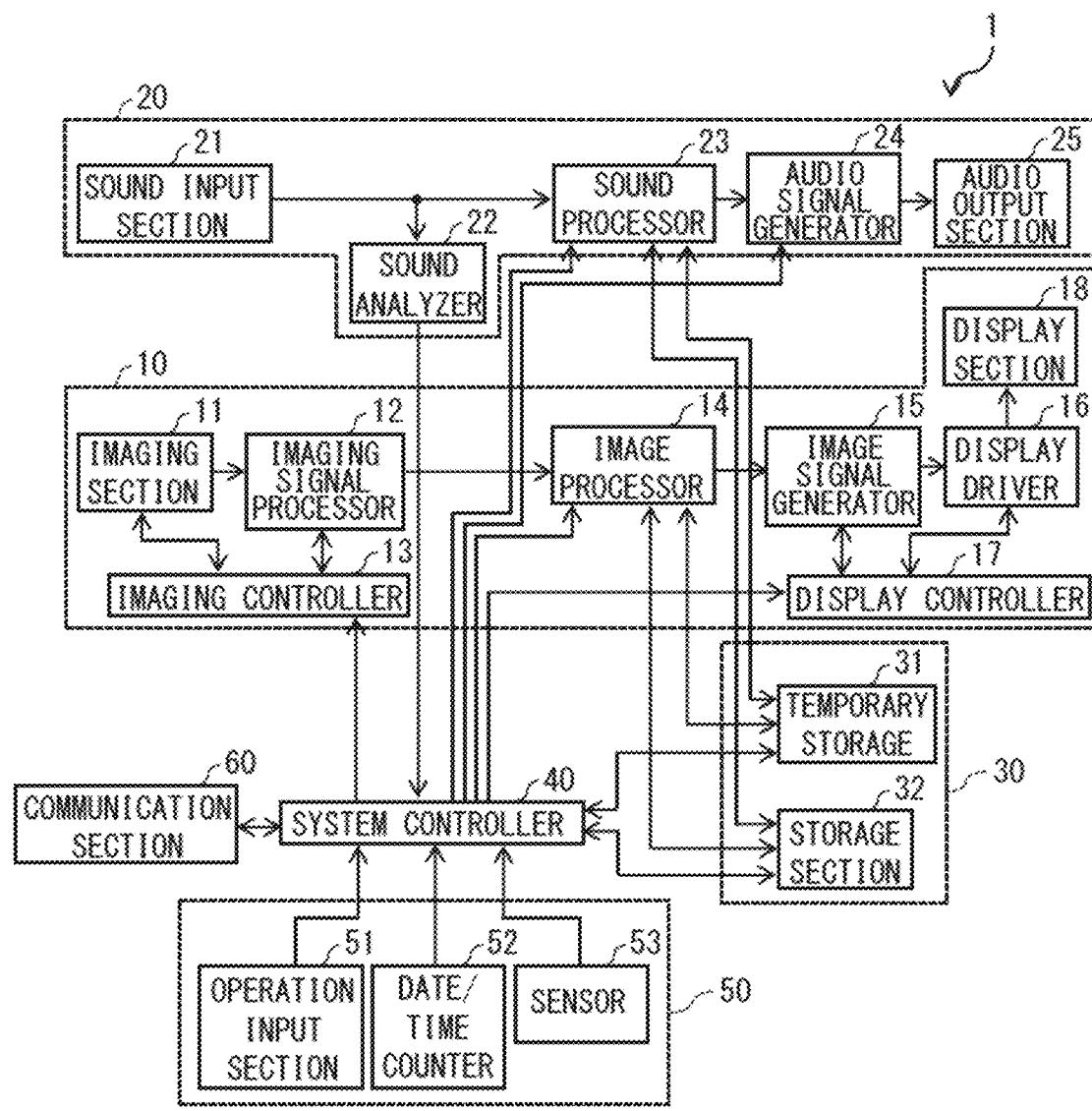

[FIG. 2]
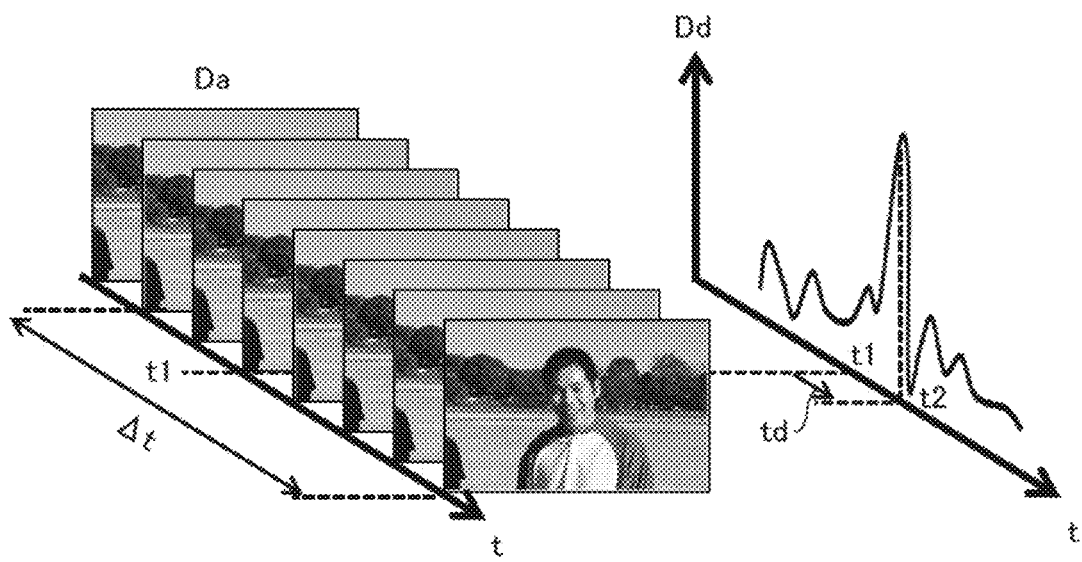

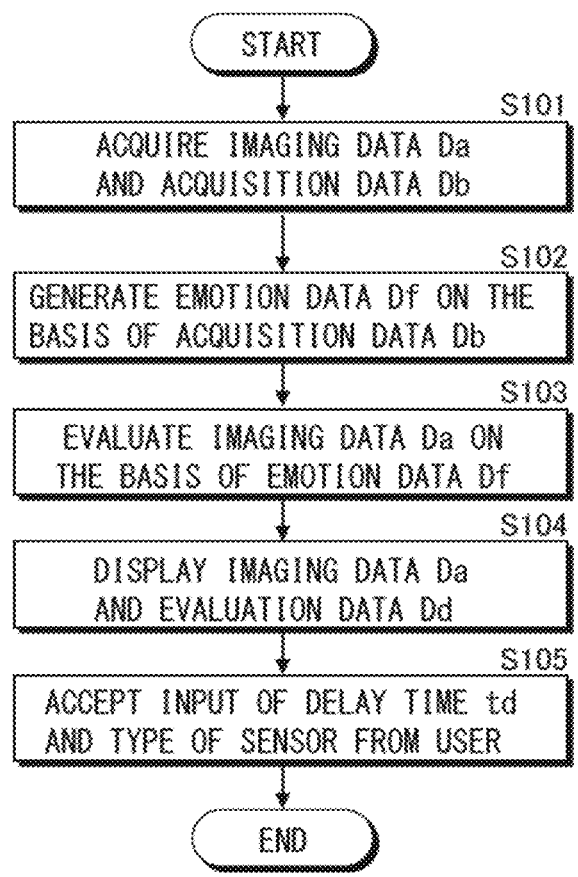
[FIG. 3]

[FIG. 4]
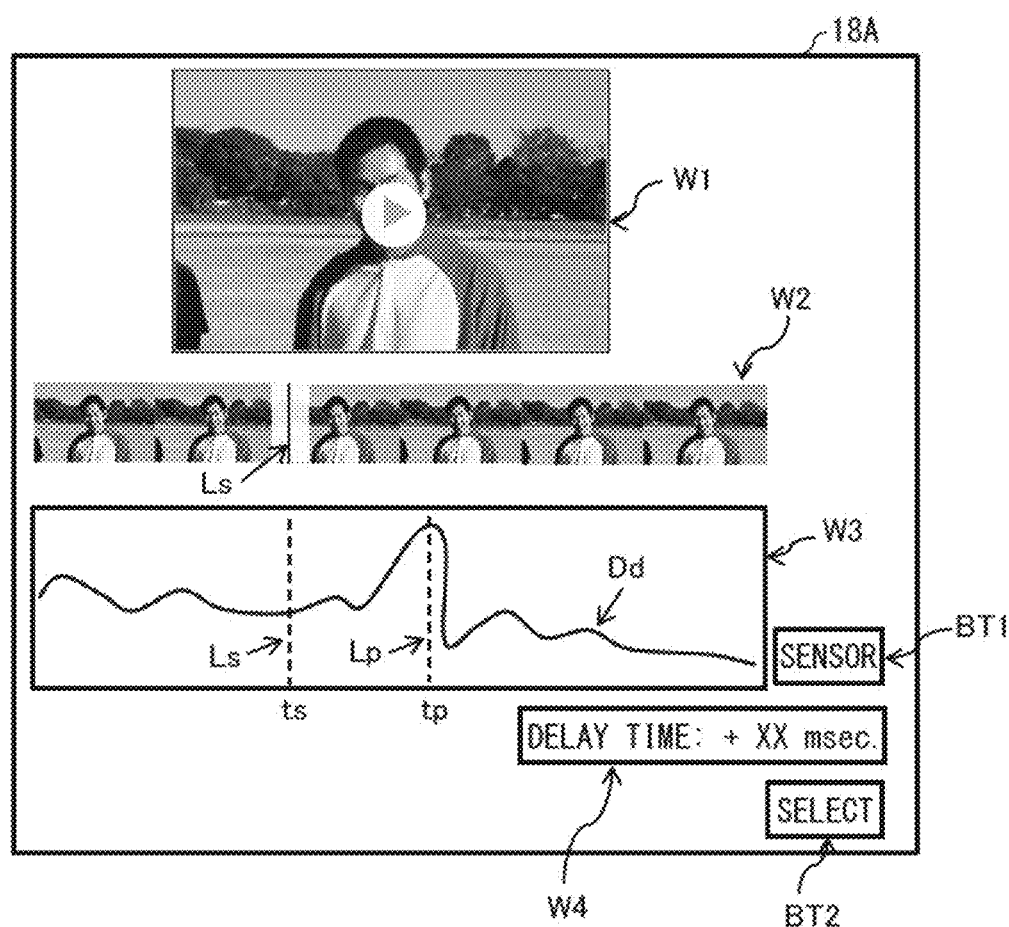

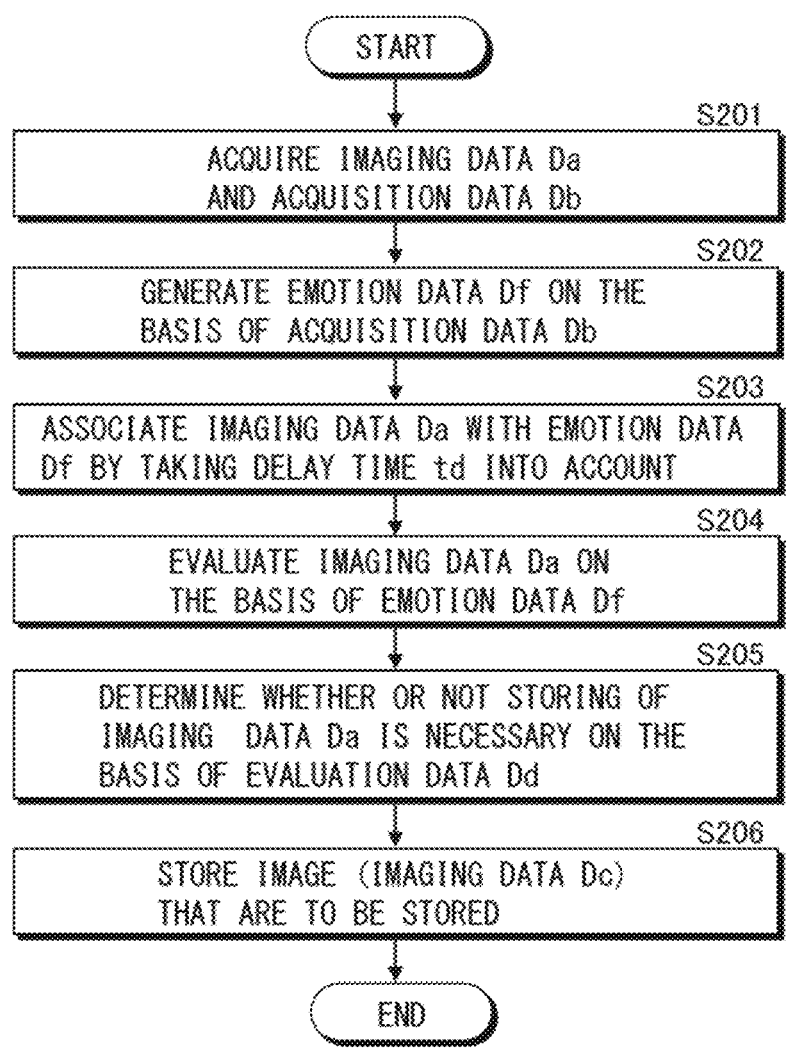

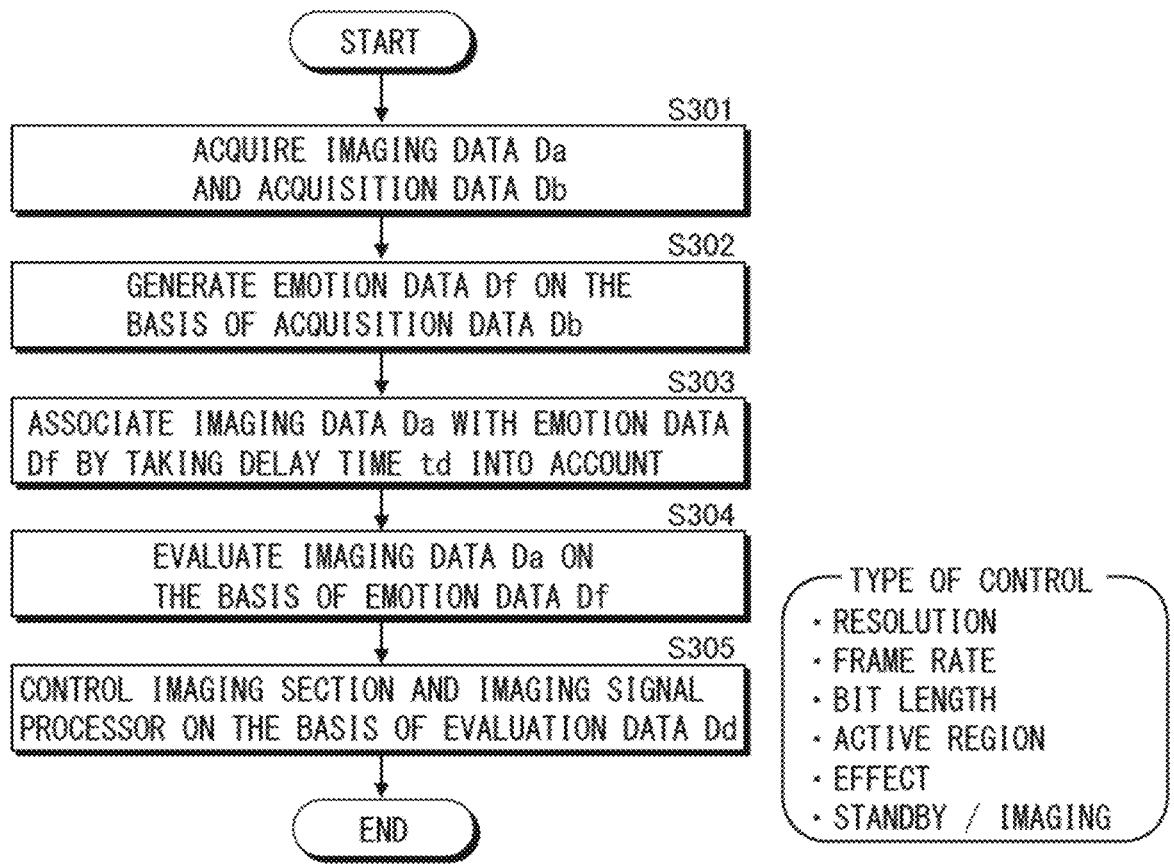

[ FIG. 7 ]
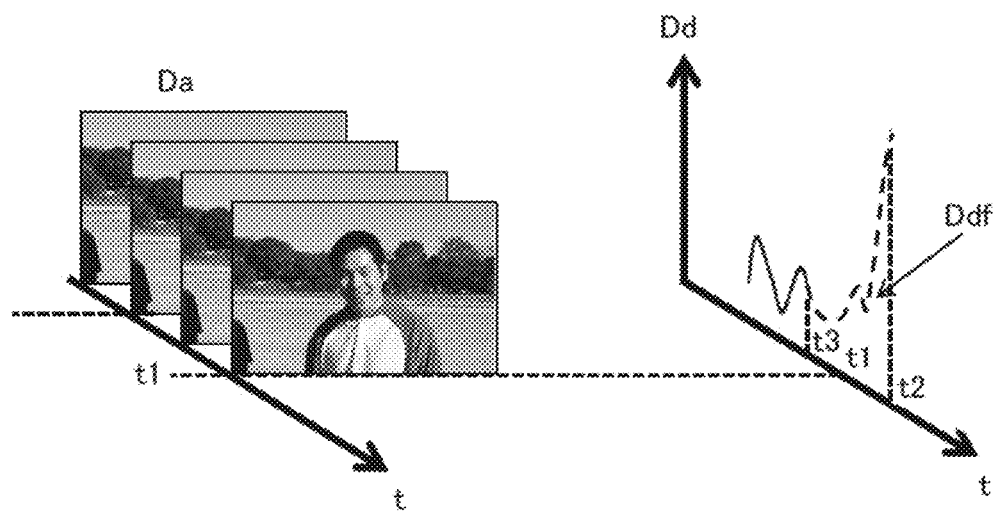

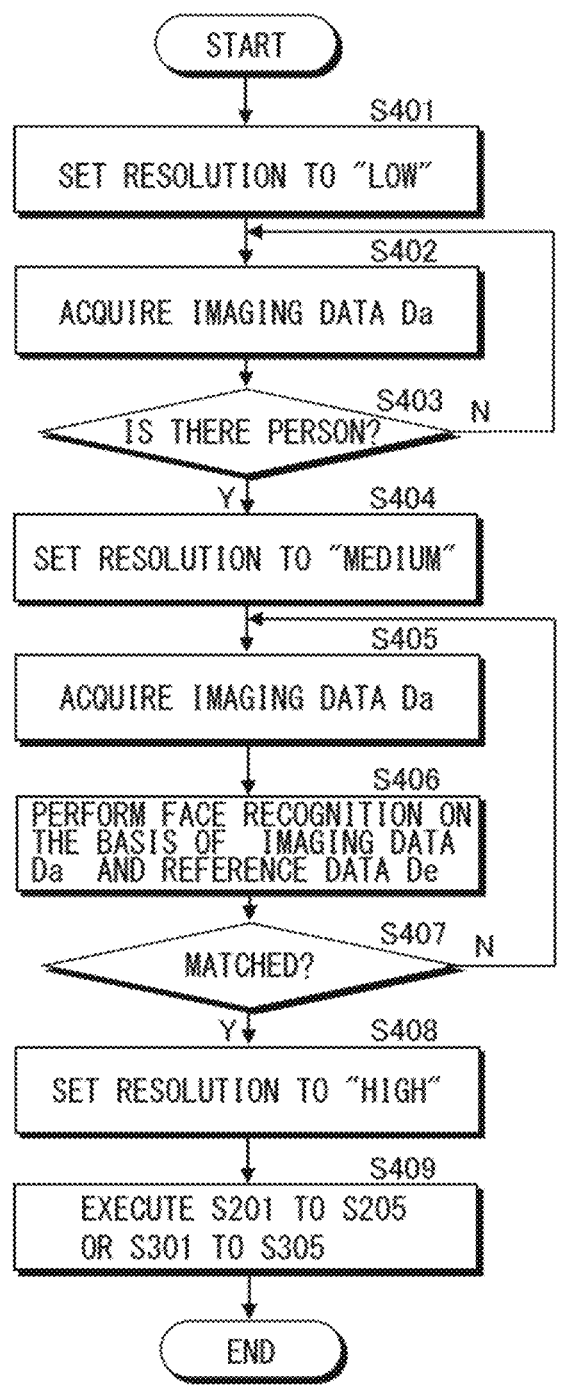

[FIG. 9]
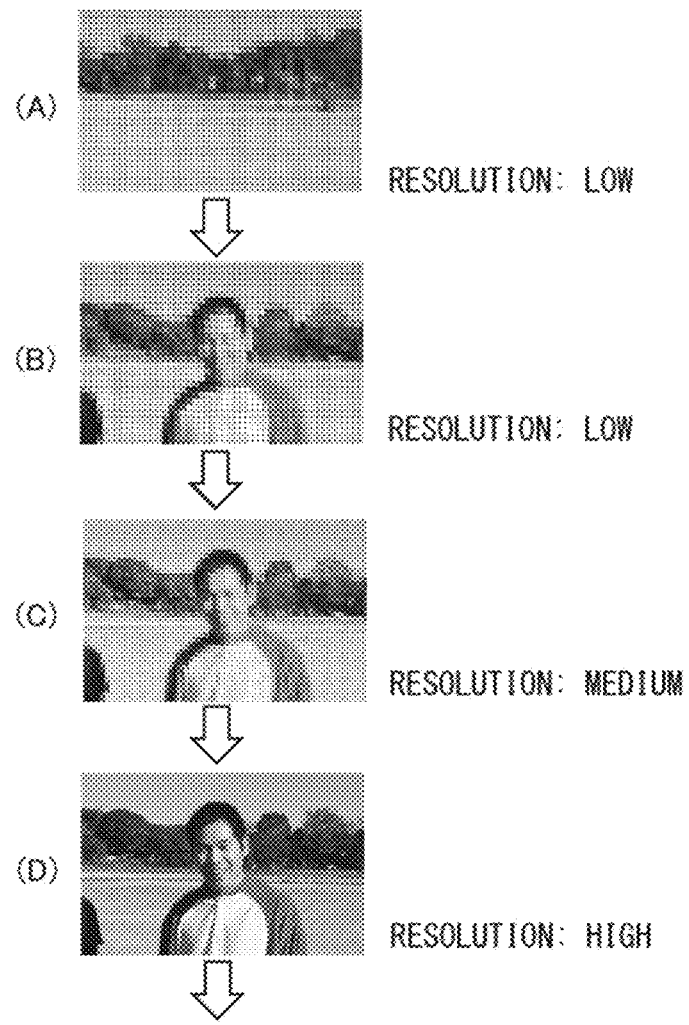

[ FIG. 10 ]
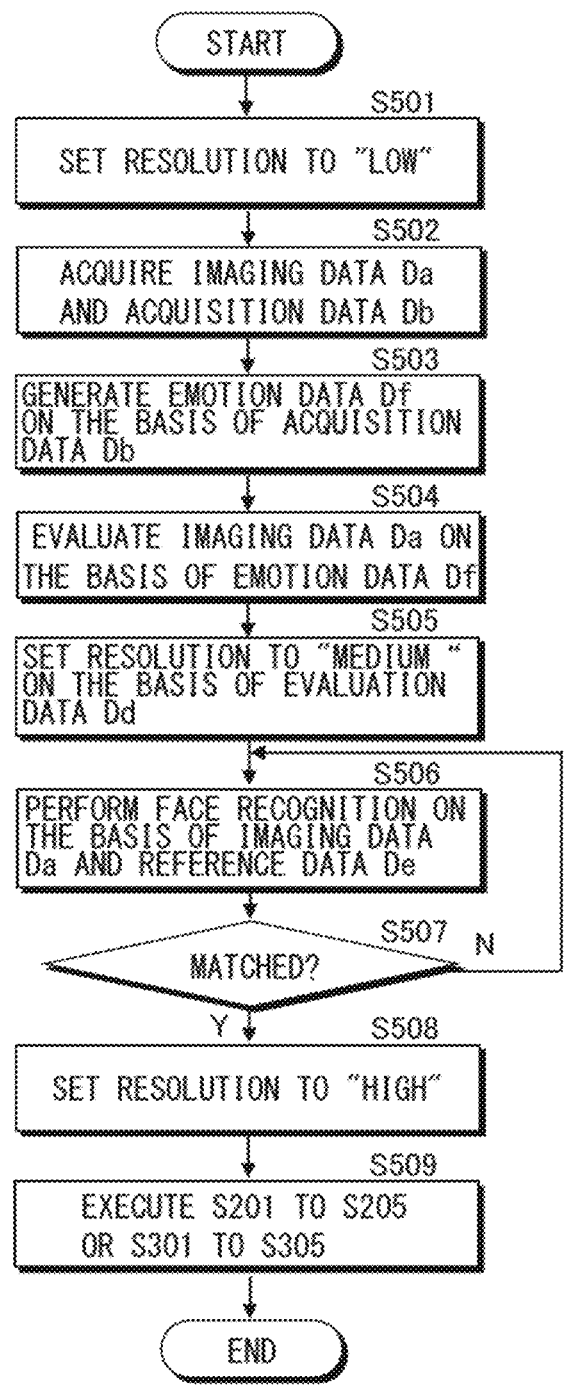

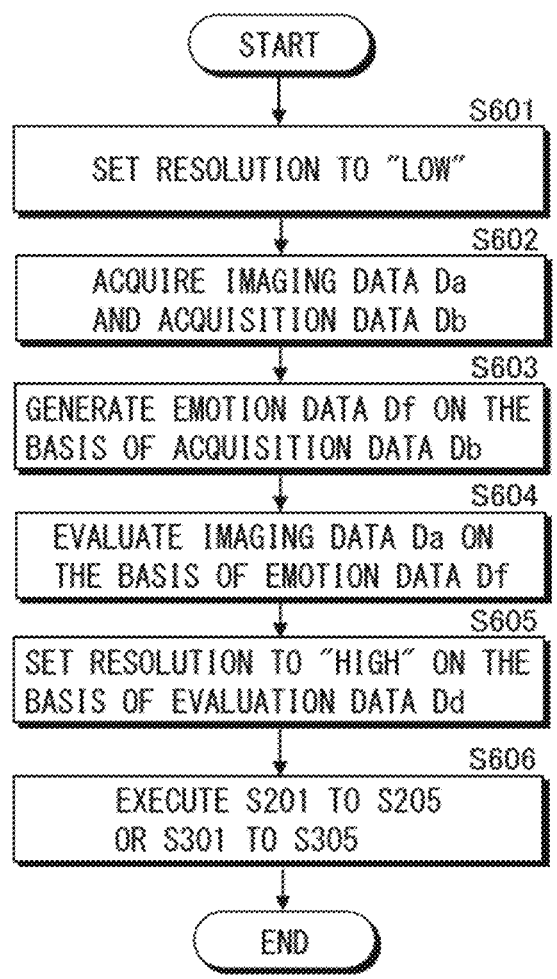
[ FIG. 11 ]

[FIG. 12]
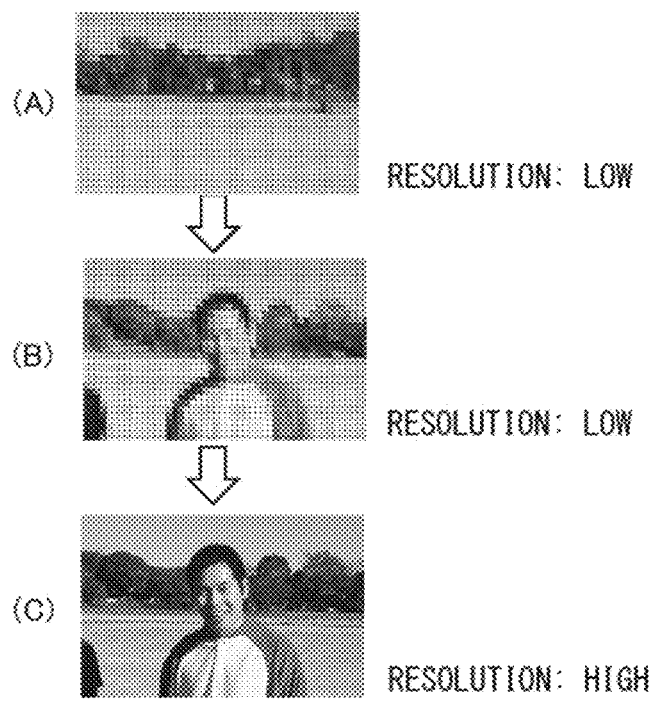

[ FIG. 13 ]
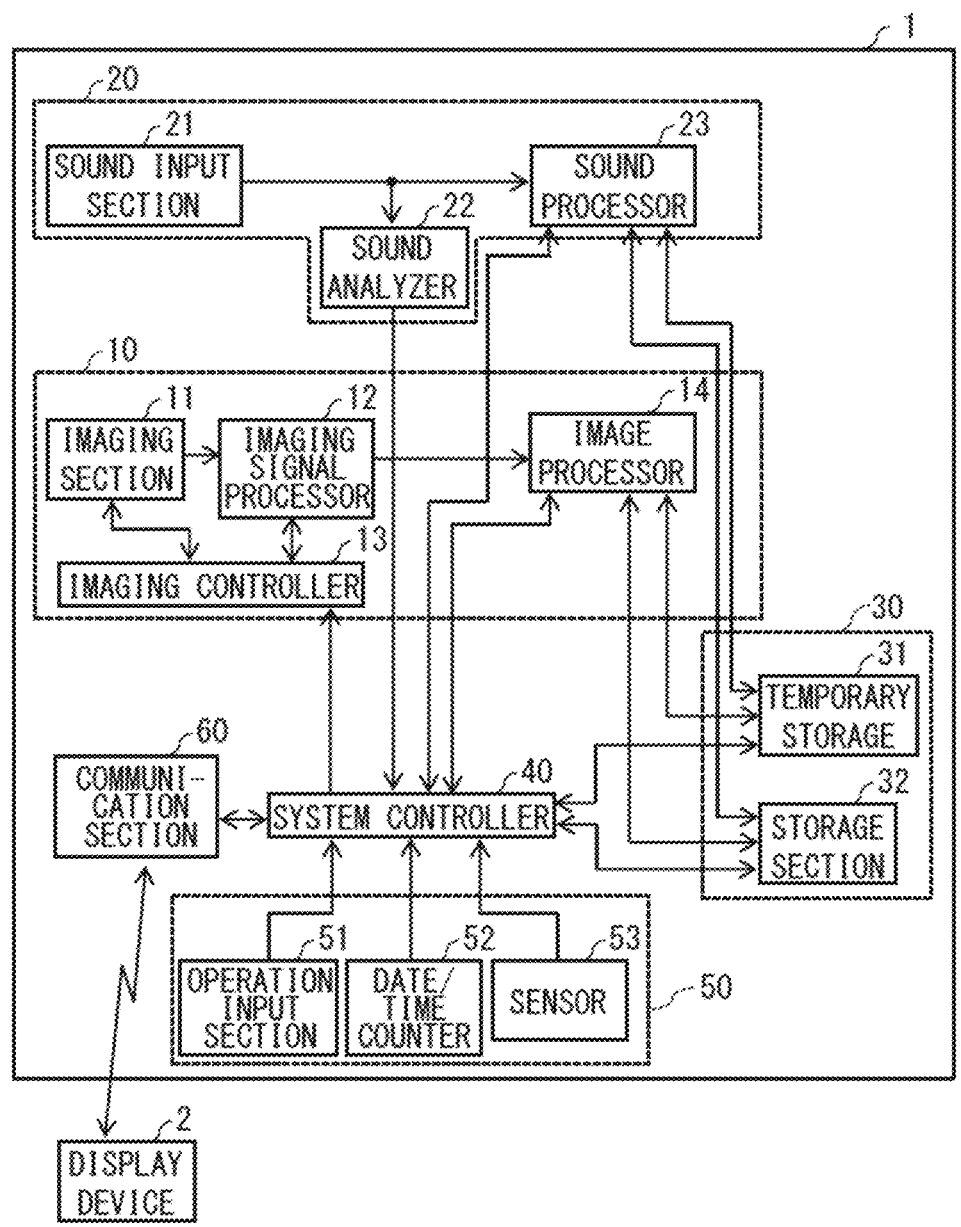

[FIG. 14]
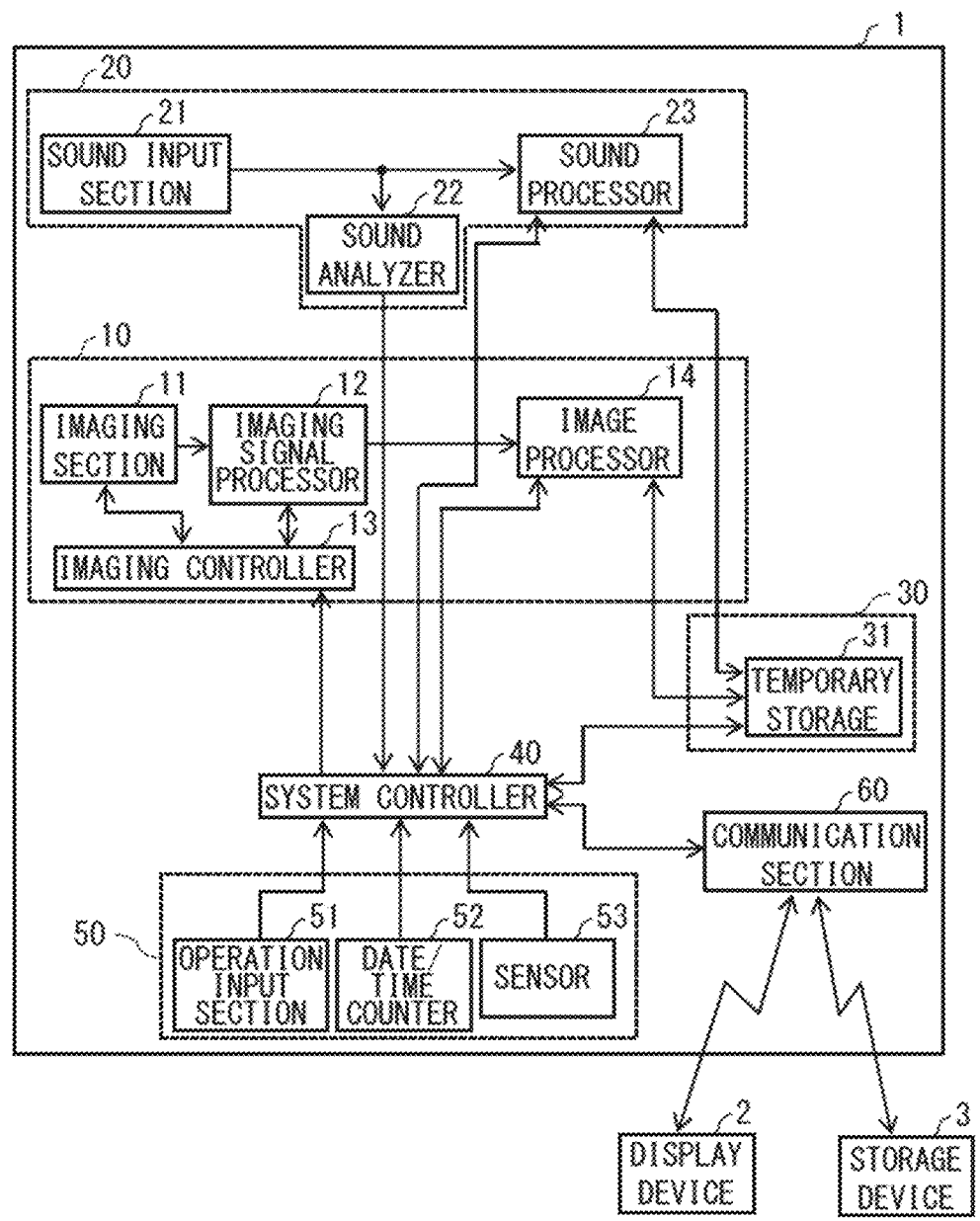

[FIG. 15]
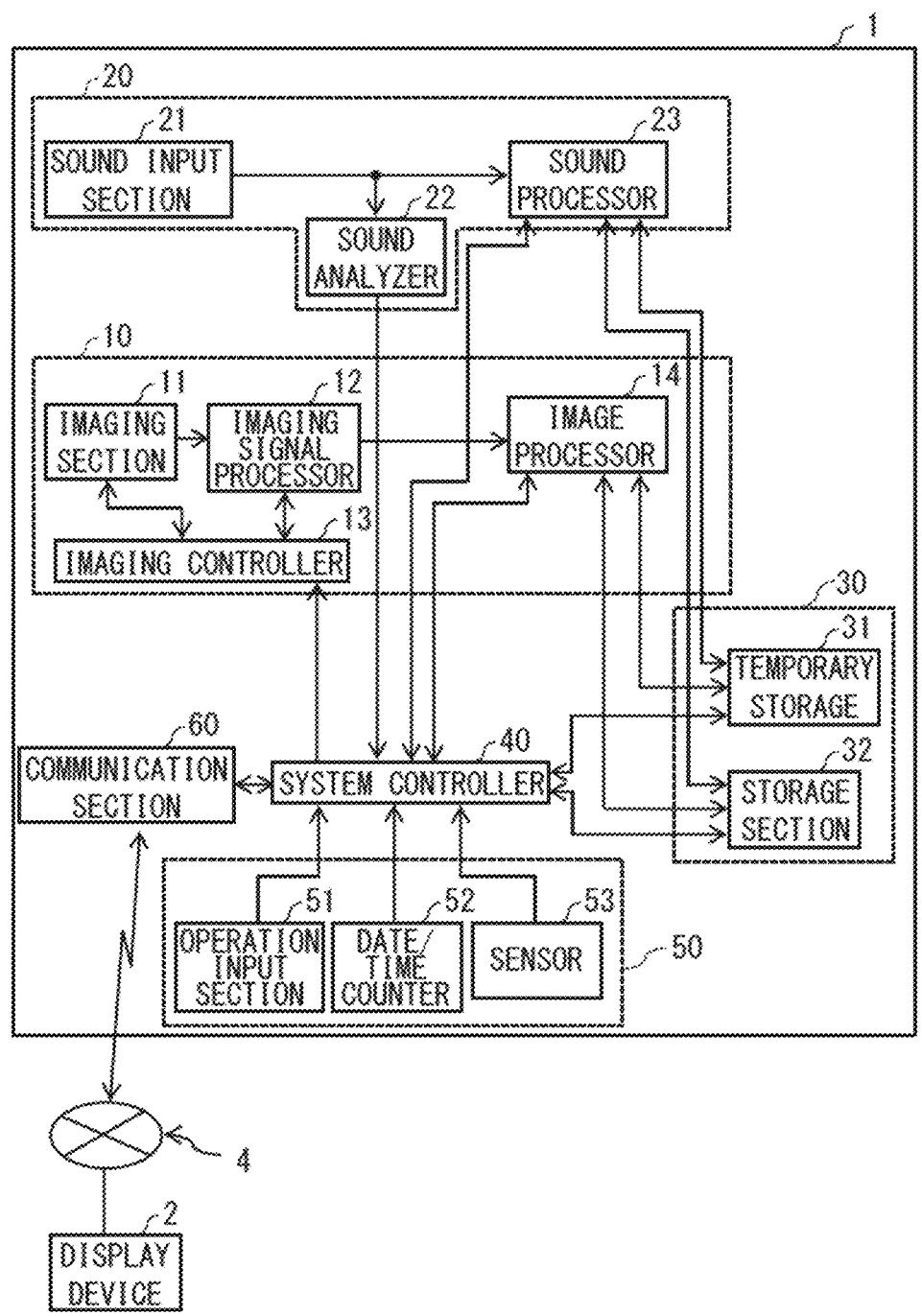

[ FIG. 16 ]
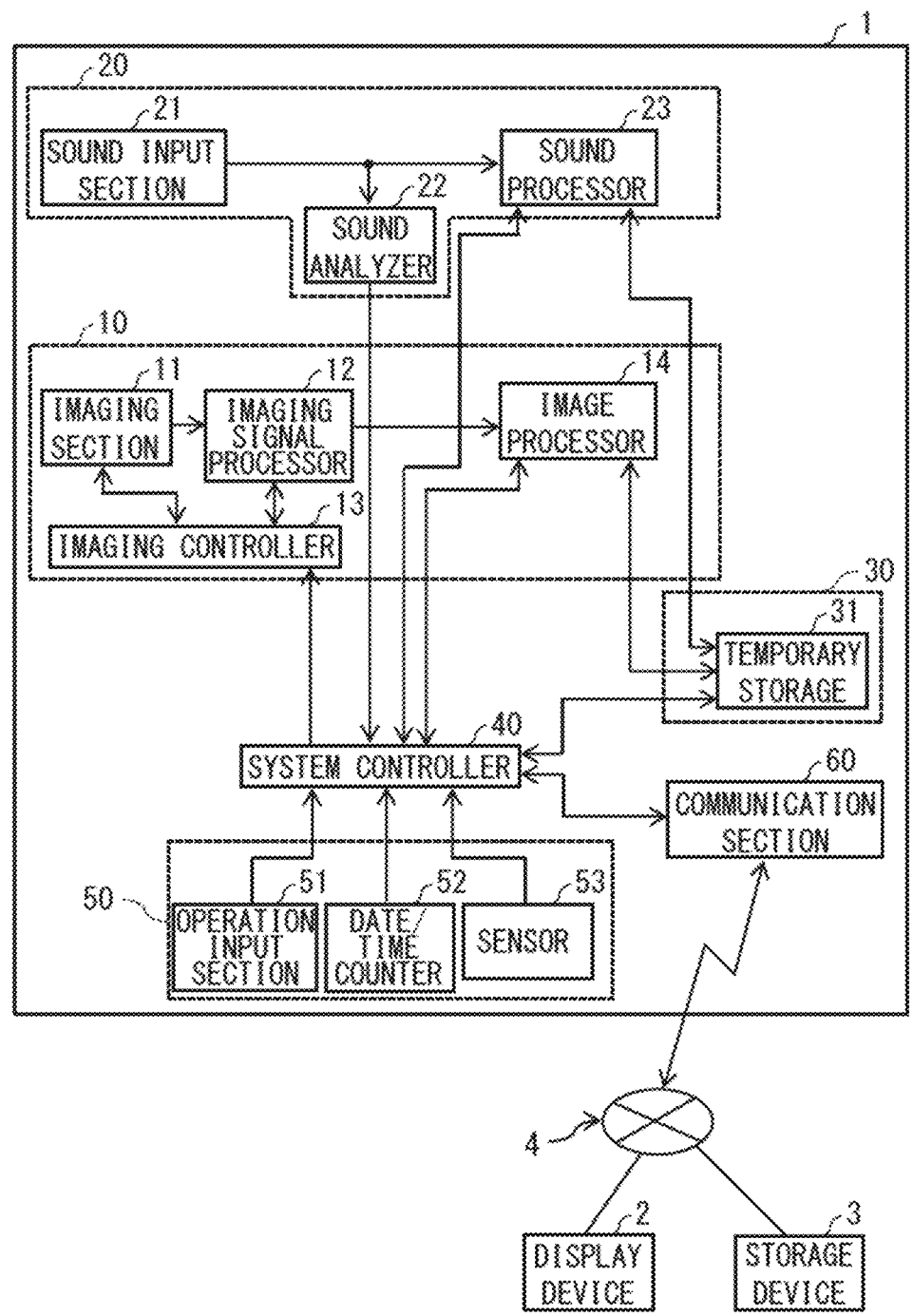

[ FIG. 17 ]
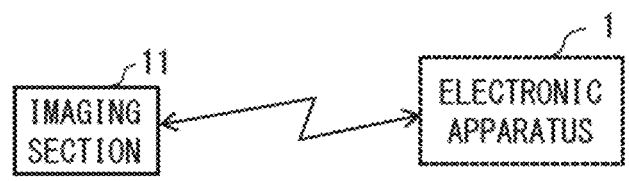

[ FIG. 18 ]
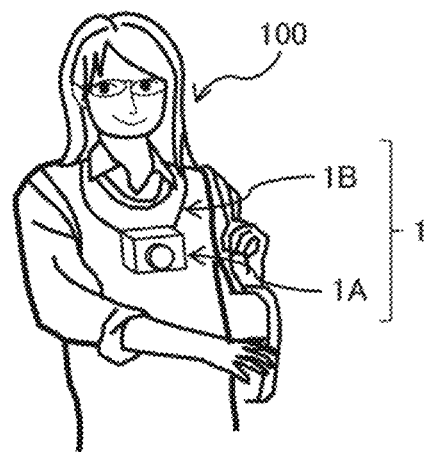
[ FIG. 19 ]
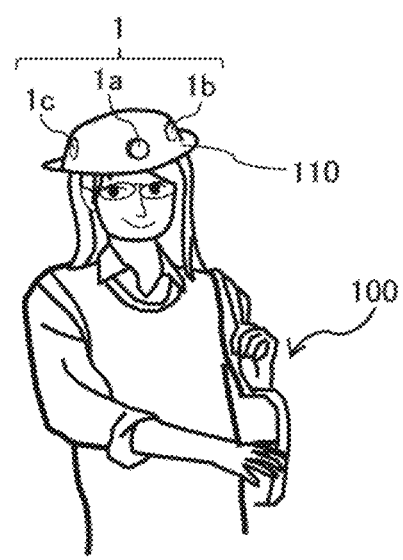

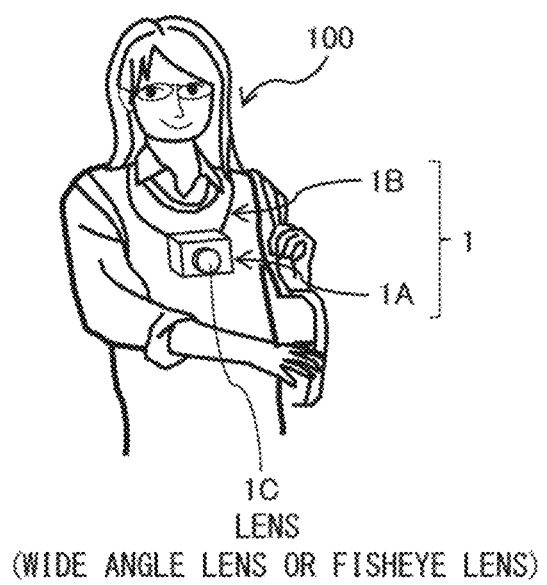
[FIG. 20]
LENS
(WIDE ANGLE LENS OR FISHEYE LENS)

ELECTRONIC APPARATUS AND IMAGING SYSTEM

TECHNICAL FIELD

The present disclosure relates to an electronic apparatus and an imaging system.

BACKGROUND ART

A digital camera or a smartphone has recently equipped with a function called "smile shutter" (registered trademark) that automatically releases a shutter in response to a determination result of whether or not a subject has a smile in order to accurately capture a moment of a smile (for example, see PTL 1).

CITATION LIST

Patent Literature

PTL 1: Japanese Unexamined Patent Application Publication No. 2018-151660

SUMMARY OF THE INVENTION

Incidentally, a user may want to take a picture not only at a moment of smile, but also at a moment of a natural expression of a child or a precious moment at an event, for example. However, when the user holds a camera, the natural expression may disappear and the expression becomes a fake smile or a tense expression, making it difficult to take the natural expression. In addition, the precious moment comes along suddenly, the user may thus miss a shot while holding the camera. Accordingly, it is desirable to provide an electronic apparatus and an imaging system that makes it possible for a user to take a picture without missing the moment he/she wants to take.

An electronic apparatus according to an embodiment of the disclosure includes: an imaging section that acquires imaging data; a data generator that generates emotion data on a basis of acquisition data; a data processor that associates the imaging data and the emotion data with each other in chronological order; and a controller that causes a setting of the imaging section to be changed in chronological order on a basis of the emotion data.

An imaging system according to an embodiment of the disclosure includes: an imaging section that acquires imaging data; a data generator that generates emotion data on a basis of acquisition data; a data processor that associates the imaging data and the emotion data with each other in chronological order; and a controller that controls the imaging section on a basis of the emotion data.

In the electronic apparatus and the imaging system according to an embodiment of the disclosure, the imaging data and the emotion data are associated with each other in chronological order, and the imaging section is controlled on the basis of the emotion data. Thus, for example, in a case where the emotion data varies at a moment when a user reacts to a subject, monitoring of the emotion data makes it possible to grasp a moment that the user would like to take a picture. As a result, for example, it becomes possible to obtain the imaging data in response to the change in the emotion data without the user manually releasing a shutter.

BRIEF DESCRIPTION OF DRAWINGS

FIG. 1 is a diagram illustrating an example of functional blocks of an electronic apparatus according to an embodiment of the disclosure.

FIG. 2 is a diagram for describing a delay time.

FIG. 3 is a diagram illustrating an example of a procedure regarding adjustment of the delay time and selection of a sensor.

FIG. 4 is a diagram illustrating an example of a display screen for the adjustment of the delay time and the selection of the sensor.

FIG. 5 is a diagram illustrating an example of a procedure of controlling an imaging device.

FIG. 6 is a diagram illustrating an example of the procedure of controlling the imaging device.

FIG. 7 is a diagram illustrating an example of a method of controlling the imaging device.

FIG. 8 is a diagram illustrating an example of the procedure of controlling the imaging device.

FIG. 9 is a diagram illustrating changes in resolution in the control procedure of FIG. 8.

FIG. 10 is a diagram illustrating an example of the procedure of controlling the imaging device.

FIG. 11 is a diagram illustrating an example of the procedure of controlling the imaging device.

FIG. 12 is a diagram illustrating changes in resolution in the control procedure of FIG. 11.

FIG. 13 is a diagram illustrating a modification example of the functional blocks of the electronic apparatus of FIG. 1.

FIG. 14 is a diagram illustrating a modification example of the functional blocks of the electronic apparatus of FIG. 1.

FIG. 15 is a diagram illustrating a modification example of the functional blocks of the electronic apparatus of FIG. 1.

FIG. 16 is a diagram illustrating a modification example of the functional blocks of the electronic apparatus of FIG. 1.

FIG. 17 is a diagram illustrating a modification example of the functional blocks of the electronic apparatus of FIG. 1.

FIG. 18 is a diagram illustrating an example of a state in which the electronic apparatus of FIG. 1. FIG. 13, FIG. 14, FIG. 15, or FIG. 16 is attached to a body of a user.

FIG. 19 is a diagram illustrating an example of the state in which the electronic apparatus of FIG. 1, FIG. 13, FIG. 14, FIG. 15, or FIG. 16 is attached to the body of the user.

FIG. 20 is a diagram illustrating an example of the state in which the electronic apparatus of FIG. 1, FIG. 13, FIG. 14, FIG. 15, or FIG. 16 is attached to the body of the user.

MODES FOR CARRYING OUT THE INVENTION

In the following, modes for carrying out the present disclosure are described in detail with reference to the drawings. The following description is a specific example of the present disclosure, and the present disclosure is not limited to the following embodiment. It is to be noted that description is given in the following order.

1. Embodiment
    An example of having functions of screen display and audio output
2. Modification Examples
    Modification Example A: an example in which functions of screen display and audio output are provided to an external apparatus
    Modification Example B: an example in which a function of a storage is provided to the external apparatus Modification Example C: an example of communicating with the external apparatus via a network Modification Example D: an example of communicating with a display device and a storage device via a network Modification Example E: an example in which an imaging section is provided separately Modification Example F: an example of being configured to be attachable to a body Modification Example G: an example of including a plurality of imaging elements Modification Example H: an example of including a wide angle lens or a fisheye lens

1. EMBODIMENT

[Configuration]

An electronic apparatus 1 according to an embodiment of the disclosure will be described. FIG. 1 illustrates an example of a schematic configuration of the electronic apparatus 1 according to the present embodiment. The electronic apparatus 1 includes an imaging system that automatically acquires imaging data Dc of a scene that is meaningful to a user, without depending on an operation performed by the user on a shutter button. The electronic apparatus 1 includes, for example, an image block 10, a sound block 20, a storage block 30, a system controller 40, an external input block 50, and a communication section 60. The system controller 40 corresponds to a specific example of a "controller" according to the present disclosure.

The image block 10 includes, for example, an imaging section 11, an imaging signal processor 12, an imaging controller 13, an image processor 14, an image signal generator 15, a display driver 16, a display controller 17, and a display section 18. The image processor 14 corresponds to a specific example of a "data generator" and a "data processor" according to the present disclosure. The imaging signal processor 12 and the imaging controller 13 correspond to a specific example of the "controller" according to the present disclosure. The sound block 20 includes, for example, a sound input section 21, a sound analyzer 22, a sound processor 23, an audio signal generator 24, and an audio output section 25. The storage block 30 includes, for example, a temporary storage 31 and a storage section 32. The external input block 50 includes, for example, an operation input section 51, a date/time counter 52, and a sensor 53.

The imaging section 11 outputs imaging data Da obtained by imaging (a moving image, or a plurality of still images obtained by sequential imaging) to the imaging signal processor 12. The imaging section 11 includes, for example, a CCD (Charge Coupled Device) image sensor, a CMOS (Complementary Metal Oxide Semiconductor) image sensor, or the like.

The imaging signal processor 12 performs various types of image signal processing on the imaging data Da outputted from the imaging section 11, and includes, for example, a DSP (Digital Signal Processing) circuit. The imaging signal processor 12 may, for example, detect an amount and a direction of camera shake in the imaging data Da, determine a cut-out region in the imaging data Da in accordance with the amount and the direction of the camera shake that have been detected, and generate, on the basis of the determination, imaging data Da' in which the camera shake has been corrected.

The imaging data Da or the imaging data Da' that has been processed by the imaging signal processor 12 is outputted to the image processor 14. It is to be noted that, in the following description, the imaging data Da may be the imaging data Da'. The imaging controller 13 controls operations of the imaging section 11 and the imaging signal processor 12 in accordance with control of the system controller 40.

The image processor 14 controls transfer of the imaging data Da, the imaging data Dc, evaluation data Dd to be described later, and the like in accordance with the control of the system controller 40. That is, the image processor 14 controls the transfer of the imaging data Da, the imaging data Dc, the evaluation data Dd, and the like between: the imaging signal processor 12; and the image signal generator 15, the temporary storage 31, and the storage section 32. The evaluation data Dd is generated by the image processor 14, as described below. The image processor 14 inputs the imaging data Da, the evaluation data Dd, and the like to the temporary storage 31. The temporary storage 31 stores the imaging data Da, the evaluation data Dd. and the like. The storage section 32 stores the imaging data Dc that is a portion of the imaging data Da.

The image processor 14 further extracts the imaging data Dc that satisfies a predetermined storage condition out of the imaging data Da. A method of extracting the imaging data Dc by the image processor 14 and the evaluation data Dd will be described later in detail.

The image processor 14 also outputs the generated evaluation data Dd to the system controller 40. The system controller 40 controls the imaging section 11 and the imaging signal processor 12 on the basis of the evaluation data Dd (that is, on the basis of emotion data Df) inputted from the image processor 14. Specifically, the system controller 40 outputs, to the imaging controller 13, a control signal generated on the basis of the evaluation data Dd inputted from the image processor 14. The imaging controller 13 controls the imaging section 11 and the imaging signal processor 12 on the basis of the control signal inputted from the system controller 40. The control performed by the system controller 40 on the imaging section 11 and the imaging signal processor 12 will be described later in detail.

The image signal generator 15 generates an image signal on the basis of the imaging data Da and outputs the image signal to the display driver 16. The display driver 16 drives the display section 18 on the basis of the image signal inputted from the image signal generator 15. The display controller 17 controls operations of the image signal generator 15 and the display driver 16 in accordance with the control of the system controller 40. The display section 18 includes, for example, a panel-type display device such as a liquid crystal panel or an organic EL (Electro Luminescence) panel, and displays the imaging data Da by being driven by the display driver 16.

The sound input section 21 includes, for example, a microphone, a microphone amplifier, and an AD converter, and outputs digital sound data Sa. The microphone amplifier performs amplifying processing on a sound signal obtained by the microphone, and the AD converter performs AD-conversion on the sound signal amplified by the microphone amplifier. The sound data Sa obtained by the sound input section 21 is inputted to the sound processor 23.

The sound processor 23 controls transfer of the sound data Sa in accordance with the control of the system controller 40. That is, the sound processor 23 controls the transfer of the sound data Sa between: the sound input section 21; and the audio signal generator 24, the temporary storage 31, and the storage section 32. The sound processor 23 inputs the sound data Sa obtained by the sound input section 21 to the temporary storage 31. The temporary storage 31 stores the sound data Sa obtained by the sound input section 21 together with the imaging data Da obtained by the imaging section 11. The sound processor 23 outputs the sound data Sa obtained by the sound input section 21 to the audio signal generator 24.

The sound processor 23 controls the transfer of the sound data Sa read from the temporary storage 31 in accordance with the control of the system controller 40. That is, the sound processor 23 controls the transfer of the sound data Sa between the temporary storage 31 and the audio signal generator 24. The sound processor 23 outputs the sound data Sa read from the temporary storage 31 to the audio signal generator 24.

The audio signal generator 24 converts the inputted sound data Sa into an analog audio signal in accordance with the control of the system controller 40, and outputs the audio signal obtained by the conversion to the audio output section 25. The audio output section 25 includes, for example, an amplifier circuit that amplifies the analog audio signal, and a speaker that outputs sound on the basis of the audio signal outputted from the amplifier circuit.

The temporary storage 31 is used to buffer the imaging data Da obtained by the imaging section 11, and, for example, temporarily stores the imaging data Da and the sound data Sa in a ring-memory format. For example, the image processor 14 performs data deletion or overwriting with the imaging data Da to be newly stored, on the imaging data Da stored in the temporary storage 31 for a portion in which a period being stored in the temporary storage 31 exceeds a predetermined period (e.g., a storage period Δt to be described later).

The storage section 32 stores the imaging data Dc that satisfies the predetermined storage condition out of the imaging data Da obtained by the imaging section 11. In a case where the predetermined storage condition is satisfied, the system controller 40 extracts the imaging data Dc to be stored from the imaging data Da temporarily stored in the temporary storage 31 at that time point and transfers the imaging data Dc to the storage section 32.

Here, the imaging data Dc to be stored in the storage section 32 is, for example, imaging data that the system controller 40 has determined to be imaging data of a scene that is meaningful to a user among pieces of imaging data Da that are being imaged constantly, such as imaging data of a scene that the user is interested in, imaging data of a scene when there is a change in an emotion of the user, imaging data of a scene that remains in a memory of the user, or the like.

The operation input section 51 includes, for example, an operating object such as a key or a dial. The operation input section 51 accepts an input from the user by the operating object being operated by the user, for example, and outputs the input to the system controller 40. The date/time counter 52, for example, counts date and time (year, month, day, hour, minute, and second) and outputs the present date and time information (hereinafter referred to as "time data Dt") to the system controller 40.

The sensor 53 measures at least one of a pulse, a heart rate, an electrocardiogram, an electromyography, a respiration, a perspiration, a GSR, a blood pressure, a degree of blood oxygen saturation, a skin surface temperature, an electroencephalogram, a blood flow change, a body temperature, a motion of a body, a motion of a head, a center of gravity, a rhythm of walking or running, an eye condition, or a surrounding sound, and outputs the measurement data obtained by the measurement (hereinafter referred to as "acquisition data Db") to the system controller 40. The system controller 40 outputs the acquisition data Db inputted from the sensor 53 to the image processor 14 in association with the time data Dt inputted from the date/time counter 52.

The communication section 60 is able to communicate with an external apparatus via a network. Here, the network is, for example, a network that performs communication using a communication protocol (TCP/IP) commonly used in the Internet. The network may be, for example, a secure network that performs communication using its own communication protocol. The network may be, for example, the Internet, an intranet, or a local area network. A connection between the network and the communication section 60 may be, for example, a wired LAN (Local Area Network) such as Ethernet (registered trademark), a wireless LAN such as Wi-Fi, a cellular telephone line, or the like.

The communication section 60 may be able to communicate with an external apparatus by near field communication. The near field communication in the communication section 60 is carried out, for example, by ISO/IEC14443 (International Standard for Proximity RFID), ISO/IEC18092 (International Standard for radio communication called NFC), ISO/IEC15693 (International Standard for RFID), Bluetooth (registered trademark), or the like.

Next, a method of extracting the imaging data Dc performed by the image processor 14 will be described. First, principles of a delay time td and a method of adjusting the delay time td will be described, and thereafter, the method of extracting the imaging data Dc will be described.

FIG. 2 is a diagram for describing principles of the delay time td. FIG. 2 conceptually illustrates the imaging data Da stored in the temporary storage 31. The temporary storage 31 stores pieces of imaging data Da obtained by imaging performed by the imaging section 11 during the storage period Δt. The evaluation data Dd in FIG. 2 is a numerical evaluation of an emotion of the user generated on the basis of the acquisition data Db. The image processor 14 generates the emotion data Df on the basis of the acquisition data Db, and generates the evaluation data Dd on the basis of the generated emotion data Df.

The evaluation data Dd relates to the emotion of the user, and hence has a predetermined correspondence relationship with the imaging data Da. However, it is not possible to associate the imaging data Da and the evaluation data Dd of the same time point with each other. This is because when the user sees some kind of scene at a time point t1, the emotion (the emotion data Df) of the user changes significantly at a time point t2 which has a slight time lag from the time point t1. Accordingly, upon associating the imaging data Da with the evaluation data Dd and the emotion data Df in chronological order, the delay time td exists. Thus, the electronic apparatus 1 associates the imaging data Da and the emotion data Df with each other in chronological order, taking the delay time td into account. Specifically, the electronic apparatus 1 associates the imaging data Da acquired at the time point t1 (a first time point) and the emotion data Df acquired at the time point t2 (a second time point) that is later than the time point t1 by the delay time td with each other.

FIG. 3 illustrates an example of a procedure of adjusting the delay time td. The image processor 14 first acquires the imaging data Da and the acquisition data Db (step S101). Thereafter, the image processor 14 generates the emotion data Df on the basis of the acquisition data Db (step S102). The image processor 14 generates the emotion data Df for each type of acquisition data Db. Thereafter, the image processor 14 evaluates the imaging data Da on the basis of the emotion data Df (step S103). The image processor 14 calculates intensity data of at least pleasure/discomfort or activeness/inactiveness on the basis of the emotion data Df, for example, and sets the calculated intensity data as the evaluation data Dd.

The image processor 14 outputs the obtained evaluation data Dd along with the imaging data Da to the image signal generator 15. The image signal generator 15 generates an image signal for displaying the evaluation data Dd and the imaging data Da inputted from the image processor 14, and outputs the image signal to the display driver 16. The display driver 16 drives the display section 18 on the basis of the image signal inputted from the image signal generator 15. The display section 18 is driven by the display driver 16, and thereby displaying the imaging data Da and the evaluation data Dd (step S104).

FIG. 4 illustrates an example of a display screen for adjusting the delay time td and selecting the sensor. The display section 18 is driven by the display driver 16, and thereby displaying a display screen 18A as illustrated in FIG. 4. The display screen 18A includes, for example, a reproduction window W1, a timeline window W2, an evaluation data window W3, a delay time display window W4, a sensor selection button BT1, and a select button BT2.

In the reproduction window W1, for example, reproduction of the imaging data Da (a moving image, or a plurality of still images obtained by sequential imaging) is started by tapping the reproduction window W1, and the reproduction of the imaging data Da is stopped by tapping the reproduction window W1 during reproduction of the imaging data Da.

In the timeline window W2, for example, a portion of the imaging data Da is arranged horizontally in chronological order, and a reproduction position or a reproduction speed of the imaging data Da being reproduced in the reproduction window W1 is adjusted by swiping the timeline window W2 horizontally. In the timeline window W2, for example, a reproduction line Ls is displayed at a position corresponding to a reproduction time point ts of the imaging data Da being reproduced in the reproduction window W1.

In the evaluation data window W3, for example, the evaluation data Dd is displayed to correspond to the imaging data Da displayed in the timeline window W2 concurrently in chronological order. In the evaluation data window W3, for example, the reproduction line Ls is displayed at a position corresponding to the reproduction time point ts of the imaging data Da being reproduced in the reproduction window W1. In the evaluation data window W3, for example, a peak line Lp is further displayed at a position corresponding to a peak position (a peak time point tp) of the evaluation data Dd.

In the delay time display window W4, for example, a difference (tp−ts) between the peak time point tp and the reproduction time point ts is displayed as the delay time. In the sensor selection button BT1, for example, by tapping the sensor selection button BT1, a screen for changing sensors to be used for generating the evaluation data Dd or for blending sensors to be used for generating the evaluation data Dd (i.e., selecting a plurality of types of sensors) is displayed. The user is able to change sensors to be used for generating the evaluation data Dd and to blend sensors to be used for generating the evaluation data Dd (i.e., to select a plurality of types of sensors). In the select button BT2, for example, tapping the select button BT2 makes a delay time displayed on the delay time display window W4 at the time point of tapping to be the time delay time td.

The image processor 14 accepts the delay time td and the type of sensor determined by the operation of the user in the display screen 18A (step S105). The image processor 14 stores the accepted data of the delay time td and the type of sensor in the temporary storage 31. In this way, the adjustment of the delay time td and the selection of the sensor are performed.

Next, a method of extracting the imaging data Dc will be described.

FIG. 5 illustrates an example of a procedure of extracting the imaging data Dc. The image processor 14 first acquires the imaging data Da and the acquisition data Db (step S201). Thereafter, the image processor 14 generates the emotion data Df on the basis of the acquisition data Db (step S202). The image processor 14 generates the emotion data Df for each type of acquisition data Db. Thereafter, the image processor 14 associates the emotion data Df and the imaging data Da with each other, taking the delay time td into account (step S203). The image processor 14 stores in the temporary storage 31, for example, a table Dg in which the emotion data Df and the imaging data Da are associated with each other by taking the delay time td into account.

The image processor 14 evaluates the imaging data Da on the basis of the emotion data Df (step S204). In this case, for example, the image processor 14 evaluates the imaging data Da by using the table Dg and taking the delay time td of the emotion data Df into account. The image processor 14 determines whether or not storing of each individual piece of imaging data contained in the imaging data Da is necessary on the basis of the evaluation data Dd obtained by the evaluation (step S205). In a case where the imaging data Da is a moving image, the image processor 14 determines whether or not storing of an image of each individual frame is necessary. In a case where the imaging data Da is a plurality of still images obtained by sequential imaging, the image processor 14 determines whether or not storing of each individual still image is necessary. The image processor 14 stores, in the storage section 32, the image (the imaging data Dc) that are determined to be stored. In this way, the imaging data Dc is extracted from the imaging data Da.

Next, control to be performed on the imaging section 11 and the imaging signal processor 12 by the system controller 40 will be described.

FIG. 6 illustrates an example of a procedure of controlling the imaging section 11 and the imaging signal processor 12 by the system controller 40. The image processor 14 first acquires the imaging data Da and the acquisition data Db (step S301). Thereafter, the image processor 14 generates the emotion data Df on the basis of the acquisition data Db (step S302). The image processor 14 generates the emotion data Df for each type of acquisition data Db. Thereafter, the image processor 14 associates the imaging data Da and the emotion data Df with each other, taking the delay time td into account (step S303). The image processor 14 stores in the temporary storage 31, for example, a table Dg in which the imaging data Da and the emotion data Df are associated with each other by taking the delay time td into account.

The image processor 14 evaluates the imaging data Da on the basis of the emotion data Df (step S304). In this case, for example, the image processor 14 evaluates the imaging data Da by using the table Dg and taking the delay time td of the emotion data Df into account. The image processor 14 outputs an instruction for controlling the imaging section 11 and the imaging signal processor 12 to the system controller 40 on the basis of the evaluation data Dd obtained by the evaluation.

The instruction includes, for example, a change in at least one of resolution of the imaging section 11, a frame rate of the imaging section 11, a bit length of data to be outputted from the imaging section 11, an active pixel region in a pixel array included in the imaging section 11, an effect on the data to be outputted from the imaging section 11, or a state (standby state/imaging state) of the imaging section 11. In this case, the image processor 14 outputs to the system controller 40, on the basis of the emotion data Df, an instruction for controlling at least one of the resolution of the system controller 40, the frame rate of the imaging section 11, the bit length of the data to be outputted from the imaging section 11, the active pixel region in the pixel array included in the imaging section 11, or the effect on the data to be outputted from the imaging section 11, for example. Further, the image processor 14 also outputs to the system controller 40, on the basis of the emotion data Df, an instruction for setting the imaging section 11 to one of the standby state and the imaging state, for example.

Upon receiving an instruction for controlling the imaging section 11 and the imaging signal processor 12 from the image processor 14, the system controller 40 outputs a control signal based on the instruction to the imaging controller 13. The imaging controller 13 controls the imaging section 11 and the imaging signal processor 12 in response to the control of the system controller 40 (step S305). In this manner, the imaging section 11 and the imaging signal processor 12 are controlled by the system controller 40.

Next, countermeasures for the delay time td will be described. FIG. 7 illustrates an example of a method of controlling the imaging section 11 and the imaging signal processor 12.

Assuming that a timing at which the resolution of the imaging section 11 and the like are to be controlled is a time point t1. In this case, it is at a time point t2 that it becomes apparent that the resolution or the like should be controlled at the time point t1. The time point t2 is delayed from the time point t1 by the delay time td. In order to control the resolution and the like at the time point t1, it is preferable to predict that the resolution and the like of the imaging section 11 should be controlled at the time point t3 which is prior to the time point t1.

In a case where an influence of the delay time td on the imaging data Da is small, it may not be problematic without such a prediction. However, in a case where the influence of the delay time td on the imaging data Da is large, such a prediction may be necessary. Accordingly, as illustrated in FIG. 7, for example, the image processor 14 may perform a predictive evaluation on the imaging data Da acquired after a time point t3-td on the basis of previously obtained evaluation data Dd (e.g., evaluation data Dd prior to the time point t3) and previously obtained imaging data Da (e.g., imaging data Da prior to the time point t3). In this case, for example, it becomes possible for the image processor 14 to output an instruction for controlling the imaging section 11 and the imaging signal processor 12 after the time point t3-td to the system controller 40, on the basis of the evaluation data Dd obtained in this manner (hereinafter, referred to as "prediction evaluation data Ddf").

Next, a specific example of the method of controlling the imaging section 11 and the imaging signal processor 12 will be described. FIG. 8 illustrates an example of the procedure of controlling the imaging section 11 and the imaging signal processor 12. It is to be noted that, in this case, the storage section 32 stores reference data De to be used for face recognition. The reference data De includes, for example, face data of a target of the face recognition (reference data related to a subject). The reference data De may include, for example, a plurality of pieces of face data.

It is to be noted that, a case in which the resolution of the imaging section 11 is controlled is described below. However, it is possible to perform a similar control even in a case where at least one of the resolution of the imaging section 11, the frame rate of the imaging section 11, the bit length of data to be outputted from the imaging section 11, the active pixel region in the pixel array included in the imaging section 11, the effect on the data to be outputted from the imaging section 11, or the state (standby state/imaging state) of the imaging section 11 is controlled.

The system controller 40 first sets the resolution of the imaging section 11 to "low" (step S401). Specifically, the system controller 40 outputs a control signal for setting the resolution of the imaging section 11 to "low" to the imaging controller 13. The imaging controller 13 outputs a control signal for setting the resolution of the imaging section 11 to "low" to the imaging section 11 in response to the control of the system controller 40. As a result, the imaging section 11 performs imaging with the resolution set to "low", and acquires imaging data Da whose resolution is "low" as illustrated in, for example, (A) in FIG. 9 (step S402).

Thereafter, the image processor 14 determines whether the imaging data Da whose resolution is "low" includes a person (step S403). In a case where no person is included as a result thereof, the imaging section 11 continues to perform imaging with the resolution set to "low". In contrast, for example, in a case where a person is included in the imaging data Da as illustrated in, for example, (B) in FIG. 9, the image processor 14 outputs an instruction for setting the resolution to "medium" to the system controller 40. Upon receiving the instruction for setting the resolution to "medium" from the image processor 14, the system controller 40 outputs a control signal based on the instruction to the imaging controller 13. The imaging controller 13 outputs a control signal for setting the resolution of the imaging section 11 to "medium" to the imaging section 11 in response to the control of the system controller 40 (step S404). As a result, the imaging section 11 performs imaging with the resolution set to "medium", and acquires imaging data Da whose resolution is set to "medium" as illustrated in, for example, (C) in FIG. 9 (step S405).

Thereafter, the image processor 14 performs face recognition on the basis of the imaging data Da whose resolution is "medium" and the reference data De read from the storage section 32 (step S406). In this case, the image processor 14 determines whether or not there is a person in the imaging data Da who matches the reference data De (step S407). In a case where there is no person in the imaging data Da who matches the reference data De as a result thereof, the imaging is continued with the resolution set to "medium". In contrast, for example, in a case where there is a person in the imaging data Da who matches the reference data De, the image processor 14 outputs an instruction for setting the resolution to "high" to the system controller 40. Upon receiving the instruction for setting the resolution to "high" from the image processor 14, the system controller 40 outputs a control signal based on the instruction to the imaging controller 13. The imaging controller 13 outputs a control signal for setting the resolution of the imaging section 11 to "high" to the imaging section 11 in response to the control of the system controller 40 (step S408). As a result, the imaging section 11 performs imaging with the resolution set to "high", and acquires imaging data Da whose resolution is set to "high" as illustrated in, for example, (D) in FIG. 9.

Thereafter, the electronic apparatus 1 executes steps S201 to S205 described above or steps S301 to S305 described above (step S409). In this manner, the setting of the resolution using the face recognition is performed.

Next, another method of setting the resolution using the face recognition will be described. FIG. 10 illustrates an example of the procedure of controlling the imaging section 11 and the imaging signal processor 12. It is to be noted that, also in this case, the storage section 32 stores the reference data De to be used for the face recognition.

It is to be noted that, a case in which the resolution of the imaging section 11 is controlled is described below. However, it is possible to perform a similar control even in a case where at least one of the resolution of the imaging section 11, the frame rate of the imaging section 11, the bit length of data to be outputted from the imaging section 11, the active pixel region in the pixel array included in the imaging section 11, the effect on the data to be outputted from the imaging section 11, or the state (standby state/imaging state) of the imaging section 11 is controlled.

The system controller 40 first sets the resolution of the imaging section 11 to "low" (step S501). Specifically, the system controller 40 outputs a control signal for setting the resolution of the imaging section 11 to "low" to the imaging controller 13. The imaging controller 13 outputs a control signal for setting the resolution of the imaging section 11 to "low" to the imaging section 11 in response to the control of the system controller 40. As a result, the imaging section 11 performs imaging with the resolution set to "low", and acquires imaging data Da whose resolution is "low" as illustrated in, for example, (A) in FIG. 9 (step S502). Further, the image processor 14 acquires the acquisition data Db from the system controller 40 (step S502).

Thereafter, the image processor 14 generates the emotion data Df on the basis of the acquisition data Db (step S503). The image processor 14 generates the emotion data Df for each type of acquisition data Db. Thereafter, the image processor 14 evaluates the imaging data Da on the basis of the emotion data Df (step S504). The image processor 14 calculates intensity data of at least pleasure/discomfort or activeness/inactiveness on the basis of the emotion data Df, for example, and sets the calculated intensity data as the evaluation data Dd.

In a case where the obtained evaluation data Dd satisfies a predetermined criterion, the image processor 14 outputs an instruction for setting the resolution to "medium" to the system controller 40. Upon receiving the instruction for setting the resolution to "medium" from the image processor 14, the system controller 40 outputs a control signal based on the instruction to the imaging controller 13. The imaging controller 13 outputs a control signal for setting the resolution of the imaging section 11 to "medium" to the imaging section 11 in response to the control of the system controller 40 (step S505). As a result, the imaging section 11 performs imaging with the resolution set to "medium", and acquires imaging data Da whose resolution is set to "medium" as illustrated in, for example, (C) in FIG. 9.

Thereafter, the image processor 14 performs face recognition on the basis of the imaging data Da whose resolution is "medium" and the reference data De read from the storage section 32 (step S506). In this case, the image processor 14 determines whether or not there is a person in the imaging data Da who matches the reference data De (step S507). In a case where there is no person in the imaging data Da who matches the reference data De as a result thereof, the imaging is continued with the resolution set to "medium". In contrast, for example, in a case where there is a person in the imaging data Da who matches the reference data De, the image processor 14 outputs an instruction for setting the resolution to "high" to the system controller 40. Upon receiving the instruction for setting the resolution to "high" from the image processor 14, the system controller 40 outputs a control signal based on the instruction to the imaging controller 13. The imaging controller 13 outputs a control signal for setting the resolution of the imaging section 11 to "high" to the imaging section 11 in response to the control of the system controller 40 (step S508). As a result, the imaging section 11 performs imaging with the resolution set to "high", and acquires imaging data Da whose resolution is set to "high" as illustrated in, for example, (D) in FIG. 9.

Thereafter, the electronic apparatus 1 executes steps S201 to S205 described above or steps S301 to S305 described above (step S509). In this manner, the setting of the resolution using the face recognition is performed.

Next, a method of setting resolution using an emotion will be described. FIG. 11 illustrates an example of the procedure of controlling the imaging section 11 and the imaging signal processor 12. It is to be noted that, in this case, the storage section 32 stores the reference data De to be used for evaluation of the emotion. The reference data De includes, for example, reference data related to the emotion of the user. The reference data De may include, for example, the reference data related to the emotion of the user for each type of acquisition data Db.

It is to be noted that, a case in which the resolution of the imaging section 11 is controlled is described below. However, it is possible to perform a similar control even in a case where at least one of the resolution of the imaging section 11, the frame rate of the imaging section 11, the bit length of data to be outputted from the imaging section 11, the active pixel region in the pixel array included in the imaging section 11, the effect on the data to be outputted from the imaging section 11, or the state (standby state/imaging state) of the imaging section 11 is controlled.

The system controller 40 first sets the resolution of the imaging section 11 to "low" (step S601). Specifically, the system controller 40 outputs a control signal for setting the resolution of the imaging section 11 to "low" to the imaging controller 13. The imaging controller 13 outputs a control signal for setting the resolution of the imaging section 11 to "low" to the imaging section 11 in response to the control of the system controller 40. As a result, the imaging section 11 performs imaging with the resolution set to "low", and acquires imaging data Da whose resolution is "low" as illustrated in, for example, (A) in FIG. 12 (step S602). Further, the image processor 14 acquires the acquisition data Db from the system controller 40 (step S602).

Thereafter, the image processor 14 generates the emotion data Df on the basis of the acquisition data Db (step S603). The image processor 14 generates the emotion data Df for each type of acquisition data Db. Thereafter, the image processor 14 evaluates the imaging data Da on the basis of the emotion data Df (step S604). The image processor 14 calculates intensity data of at least pleasure/discomfort or activeness/inactiveness on the basis of the emotion data Df and the reference data De, for example, and sets the calculated intensity data as the evaluation data Dd.

For example, it is assumed that in a case where the imaging data Da including a person as illustrated in (B) in FIG. 12 is obtained, the obtained evaluation data Dd satisfies the predetermined criterion. In this case, the image processor 14 outputs an instruction for setting the resolution to "high" to the system controller 40. Upon receiving the instruction for setting the resolution to "high" from the image processor 14, the system controller 40 outputs a control signal based on the instruction to the imaging controller 13. The imaging controller 13 outputs a control signal for setting the resolution of the imaging section 11 to "high" to the imaging section 11 in response to the control of the system controller 40 (step S605). As a result, the imaging section 11 performs imaging with the resolution set to "high", and acquires imaging data Da whose resolution is set to "high" as illustrated in, for example, (C) in FIG. 12.

Thereafter, the electronic apparatus 1 executes steps S201 to S205 described above or steps S301 to S305 described above (step S606). In this manner, the setting of the resolution using emotion is performed.

[Effects]

Next, effects of the electronic apparatus 1 according to the present embodiment will be described.

A digital camera or a smartphone has recently equipped with a function called "smile shutter" (registered trademark) that automatically releases a shutter in response to a determination result of whether or not a subject has a smile in order to accurately capture a moment of a smile.

Incidentally, a user may want to take a picture not only at a moment of smile, but also at a moment of a natural expression of a child or a precious moment at an event, for example. However, when the user holds a camera, the natural expression may disappear and the expression becomes a fake smile or a tense expression, making it difficult to take the natural expression. In addition, the precious moment comes along suddenly, the user may thus miss a shot while holding the camera.

In contrast, in the electronic apparatus 1 according to the present embodiment, the imaging data Da and the emotion data Df are associated with each other in chronological order, and the imaging section 11 is controlled on the basis of the emotion data Df. Thus, for example, in a case where the emotion data Df varies at a moment when a user reacts to a subject, monitoring of the emotion data Df makes it possible to grasp a moment that the user would like to take a picture. As a result, for example, it becomes possible to obtain imaging data Dc of a scene that is meaningful to a user, in response to the change in emotion data Df and the evaluation data Dd without the user manually releasing a shutter. Further, since it is not necessary for the user to manually release the shutter, the user does not have to hold the camera, making it possible to take a natural expression.

Further, the present embodiment uses the acquisition data Db including the measurement data related to at least one of a pulse, a heart rate, an electrocardiogram, an electromyography, a respiration, a perspiration, a GSR, a blood pressure, a degree of blood oxygen saturation, a skin surface temperature, an electroencephalogram, a blood flow change, a body temperature, a motion of a body, a motion of a head, a center of gravity, a rhythm of walking or running, an eye condition, or a surrounding sound. This makes it possible to generate the emotion data Df accurately.

Further, in the present embodiment, the imaging data Da is evaluated on the basis of the emotion data Df, and the imaging section 11 and the imaging signal processor 12 are controlled on the basis of the result of the evaluation (the evaluation data Dd). This makes it possible to obtain the imaging data Dc of the scene that is meaningful to the user, in response to the change in the emotion data Df and the evaluation data Dd without the user manually releasing a shutter.

Further, in the present embodiment, the intensity data of at least pleasure/discomfort or activeness/inactiveness is calculated on the basis of the emotion data Df, and the imaging section 11 is controlled on the basis of the intensity data obtained by the calculation. This makes it possible to obtain the imaging data Dc of the scene that is meaningful to the user, in response to the change in the emotion data Df and the evaluation data Dd without the user manually releasing a shutter.

Further, in the present embodiment, at least one of the resolution, the frame rate, the bit length, the effect, or the active pixel region in the imaging section is controlled on the basis of the emotion data Df and the evaluation data Dd. This makes it possible for the system controller 40 to, for example, reduce the resolution, reduce the frame rate, reduce the bit length, eliminate the effect, or reduce the active pixel region in the imaging section, except when acquiring the imaging data Dc of the scene that is meaningful to the user. In such a case, it is possible to lower the power consumption, which allows the electronic apparatus 1 to perform imaging over a long period of time.

Further, in the present embodiment, the imaging section 11 is set to one of the standby state and the imaging state on the basis of the emotion data Df. This makes it possible for the system controller 40 to set the imaging section 11 to the standby state, except when acquiring the imaging data Dc of the scene that is meaningful to the user. In such a case, it is possible to lower the power consumption, which allows the electronic apparatus 1 to perform imaging over a long period of time.

Further, in the present embodiment, whether or not storing of the imaging data Da is necessary is determined on the basis of the emotion data Df, and the imaging data Dc of the scene that is meaningful to the user is stored in the storage section 32 on the basis of the determination. This makes it possible to obtain the imaging data Dc of the scene that is meaningful to the user, in response to the change in the emotion data Df and the evaluation data Dd without the user manually releasing a shutter.

Further, in the present embodiment, the data deletion or the overwriting with the imaging data Da to be newly stored is performed on the imaging data Da stored in the temporary storage 31 for a portion in which a period being stored in the temporary storage 31 exceeds a predetermined period. This makes it possible for the electronic apparatus 1 to perform imaging over a long period of time even in a case where the temporary storage 31 has a small capacity.

Further, in the present embodiment, the imaging data Da' in which the camera shake has been corrected is generated. This makes it possible to obtain the imaging data Dc with less camera shake, even in a case where imaging is performed while user is carrying the electronic apparatus 1.

Further, in the present embodiment, the imaging data Da acquired at the time point t1 and the emotion data Df acquired at the time point t2 that is later than the time point t1 by the delay time td are associated with each other. This makes it possible to obtain the imaging data Dc taking into account the delay time td that is unique to the emotion data Df.

Further, in the present embodiment, the imaging section 11 is controlled on the basis of the matching result between the reference data De and the imaging data Da. This allows the imaging section 11 to be controlled using the face recognition, which makes it possible to select and store what is desired to be left as the imaging data Dc.

Further, in the present embodiment, the imaging section 11 and the imaging signal processor 12 are controlled on the basis of the reference data De and the emotion data Df. This allows the user to select and store the imaging data Dc by which the user is particularly moved or impressed.

2. MODIFICATION EXAMPLES

Next, modification examples of the electronic apparatus 1 according to the embodiment described above will be described. In the following description, the same reference numerals are assigned to components common to the above-described embodiment. In addition, the description of the components common to the above-described embodiment shall be omitted as appropriate.

Modification Example A

In the embodiment described above, for example, as illustrated in FIG. 13, the image signal generator 15, the display driver 16, the display controller 17, the display section 18, the audio signal generator 24, and the audio output section 25 may be omitted. In this case, the electronic apparatus 1 may transmit, to a display device 2 including the image signal generator 15, the display driver 16, the display controller 17, the display section 18, the audio signal generator 24, and the audio output section 25, the data necessary for causing the display screen 18A as illustrated in FIG. 4 to be displayed, via the communication section 60, for example. Also in such a case, the delay time td may be set or the type of sensor may be selected in the display device 2.

Modification Example B

In the modification example A described above, the storage section 32 may be omitted, for example, as illustrated in FIG. 14. In this case, the electronic apparatus 1 may store the imaging data Dc in a storage device 3 including the storage section 32, via a communication section 60, for example.

Modification Example C

In the modification example A described above, the electronic apparatus 1 may be configured to communicate with the display device 2 via a network 4, as illustrated in FIG. 15, for example. The network 4 is a communication standard that is communicable with the display device 2 by the communication section 60.

Modification Example D

In the modification example B described above, the electronic apparatus 1 may be configured to communicate with the display device 2 or the storage device 3 via the network 4, as illustrated in FIG. 16, for example.

Modification Example E

In the embodiment described above and the modification examples thereof, an imaging section 11 may be provided separately from the electronic apparatus 1 as illustrated in FIG. 17, for example. In this case, an image obtained by the imaging section 11 is inputted to the image block 10 via the communication section 60 or the like. Also in such a case, similar effects as those of the embodiment described above may be obtained.

Modification Example F

In the embodiment described above and the modification examples A to D, the electronic apparatus 1 may further include an attachment part 1B that is able to attach the electronic apparatus 1 to a body of a user 100, as illustrated in FIG. 18, for example. In this case, the attachment part 1B is coupled to a body part 1A of the electronic apparatus 1, for example. This makes it further easier to take a natural expression of a subject, as the user 100 does not have to hold the electronic apparatus 1.

Modification Example G

In the embodiment described above and the modification examples A to D, the imaging section 11 may include imaging elements 1a, 1b, and 1c in which respective directions of optical axes are different from each other and which acquire respective pieces of specific-direction imaging data, as illustrated in FIG. 19, for example. In this case, the imaging elements 1a, 1b, and 1c are fixed attachably to and detachably from, for example, a hat 110 of the user 100. This makes it possible to image a wide range.

Modification Example H

In the embodiment described above and the modification examples A to D and F, the imaging section 11 may include a lens 1C as illustrated in FIG. 20, for example. The lens 1C is, for example, a wide angle lens or a fisheye lens. This makes it possible to image a wide range.

Although the disclosure is described hereinabove with reference to the example embodiment and modification examples, these embodiment and modification examples are not to be construed as limiting the scope of the disclosure and may be modified in a wide variety of ways. It should be appreciated that the effects described herein are mere examples. Effects of an example embodiment and modification examples of the disclosure are not limited to those described herein. The disclosure may further include any effects other than those described herein.

Moreover, the present disclosure may have the following configurations.

(1)
An electronic apparatus including:
an imaging section that acquires imaging data;
a data generator that generates emotion data on a basis of acquisition data;
a data processor that associates the imaging data and the emotion data with each other in chronological order; and
a controller that causes a setting of the imaging section to be changed in chronological order on a basis of the emotion data.

(2)
The electronic apparatus according to (1), in which the acquisition data includes measurement data related to at least one of a pulse, a heart rate, an electrocardiogram, an electromyography, a respiration, a perspiration, a GSR, a blood pressure, a degree of blood oxygen saturation, a skin surface temperature, an electroencephalogram, a blood flow change, a body temperature, a motion of a body, a motion of a head, a center of gravity, a rhythm of walking or running, an eye condition, or a surrounding sound.

(3)
The electronic apparatus according to (1) or (2), in which the controller performs evaluation in chronological order on the imaging data based on the emotion data, and controls the imaging section on a basis of a result of the evaluation.

(4)

The electronic apparatus according to any one of (1) to (3), in which the controller performs calculation of intensity data of at least pleasure/discomfort or activeness/inactiveness on the basis of the emotion data, and controls the imaging section on a basis of the intensity data obtained by the calculation.

(5)

The electronic apparatus according to any one of (1) to (4), in which the controller controls at least one of resolution, a frame rate, a bit length, an effect, or an active pixel region in the imaging section, on the basis of the emotion data.

(6)

The electronic apparatus according to any one of (1) to (4), in which the controller sets the imaging section to one of a standby state and an imaging state on the basis of the emotion data.

(7)

The electronic apparatus according to any one of (1) to (6), further including a storage that stores the imaging data, in which
the controller performs determination on whether or not storing of the imaging data is necessary on the basis of the emotion data, and causes the storage to store the imaging data on a basis of the determination.

(8)

The electronic apparatus according to any one of (1) to (6), further including a storage that stores the imaging data, in which
the controller causes the storage to store the imaging data, and performs data deletion or overwriting with the imaging data to be newly stored, on the imaging data stored in the storage for a portion in which a period being stored in the storage exceeds a predetermined period.

(9)

The electronic apparatus according to any one of (1) to (8), in which the controller detects an amount and a direction of camera shake in the imaging data, performs determination of a cut-out region in the imaging data in accordance with the amount and the direction of the camera shake that have been detected, and generates, on a basis of the determination, imaging data in which the camera shake has been corrected.

(10)

The electronic apparatus according to any one of (1) to (9), in which the data processor associates the imaging data acquired at a first time point and the emotion data acquired at a second time point with each other in chronological order, the second time point being later than the time point.

(11)

The electronic apparatus according to any one of (1) to (10), further including an attachment part that is able to attach the electronic apparatus to a body.

(12)

The electronic apparatus according to any one of (1) to (11), in which
the imaging section includes a plurality of imaging elements in which respective directions of optical axes are different from each other and which acquire respective pieces of specific-direction imaging data, and
the data processor associates, as the imaging data, the pieces of specific-direction imaging data obtained by the plurality of imaging elements with the emotion data in chronological order.

(13)

The electronic apparatus according to any one of (1) to (12), in which the imaging section includes a wide angle lens or a fisheye lens.

(14)

The electronic apparatus according to any one of (1) to (13), further including a storage that stores reference data related to a subject, in which
the controller controls the imaging section on a basis of a matching result between the reference data and the imaging data.

(15)

The electronic apparatus according to (14), in which the setting of the imaging section is performed on at least one of resolution, a frame rate, a bit length, an effect, or an active pixel region in the imaging section.

(16)

The electronic apparatus according to any one of (1) to (15), further including a storage that stores reference data related to an emotion, in which
the controller controls the imaging section on a basis of the reference data and the emotion data.

(17)

An imaging system including:
an imaging section that acquires imaging data;
a data generator that generates emotion data on a basis of acquisition data;
a data processor that associates the imaging data and the emotion data with each other in chronological order; and
a controller that controls the imaging section on a basis of the emotion data.

(18)

The imaging system according to (17), further including a storage that stores reference data related to a subject, in which
the controller controls the imaging section on a basis of a matching result between the reference data and the imaging data.

According to the electronic apparatus and the imaging system according to an embodiment of the present disclosure, the imaging data and the emotion data are associated with each other in chronological order, and the imaging section is controlled on the basis of the emotion data. Thus, it becomes possible to obtain the imaging data in response to the change in the emotion data without the user manually releasing a shutter. Accordingly, it becomes possible for the user to take a picture without missing the moment he/she wants to take. It is to be noted that effects described here are not necessarily limited and any of effects described in the present disclosure may be included.

This application claims the benefit of Japanese Priority Patent Application JP2019-068358 filed with the Japan Patent Office on Mar. 29, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. An electronic apparatus comprising:
a storage that stores a delay time;
imaging circuitry configured to receive incident light and generate imaging data based on the incident light that is received;

an electronic processor configured to
  generate emotion data on a basis of acquisition data, and
  temporally synchronize the imaging data and the emotion data with each other to generate synchronized emotion data by temporally synchronizing the imaging data acquired at a first time point and the emotion data acquired at a second time point with each other, the second time point being later than the first time point by the delay time; and
a controller configured to control one or more imaging parameters of the imaging circuitry on a basis of the synchronized emotion data.

2. The electronic apparatus according to claim 1, wherein the acquisition data includes measurement data related to at least one of a pulse, a heart rate, an electrocardiogram, an electromyography, a respiration, a perspiration, a GSR, a blood pressure, a degree of blood oxygen saturation, a skin surface temperature, an electroencephalogram, a blood flow change, a body temperature, a motion of a body, a motion of a head, a center of gravity, a rhythm of walking or running, an eye condition, or a surrounding sound.

3. The electronic apparatus according to claim 1, wherein the controller is further configured to
  perform an evaluation on the imaging data on the basis of the synchronized emotion data, and
  control the imaging circuitry on a basis of a result of the evaluation.

4. An electronic apparatus comprising:
imaging circuitry configured to receive incident light and generate imaging data based on the incident light that is received;
an electronic processor configured to
  generate emotion data on a basis of acquisition data, and
  temporally synchronize the imaging data and the emotion data with each other to
generate synchronized emotion data; and
a controller configured to control the imaging circuitry on a basis of the synchronized emotion data,
  wherein the controller is further configured to
    calculate intensity data of at least pleasure/discomfort or activeness/inactiveness on the basis of the synchronized emotion data, and
    control the imaging circuitry on a basis of the intensity data obtained by the calculation.

5. The electronic apparatus according to claim 1,
  wherein the one or more imaging parameters is one or more of a resolution, a frame rate, a bit length, an effect, an active pixel region in the imaging circuitry, or a combination thereof.

6. The electronic apparatus according to claim 1, wherein the controller is further configured to set the imaging circuitry to one of a standby state and an imaging state on the basis of the synchronized emotion data.

7. The electronic apparatus according to claim 1, further comprising:
a storage that stores the imaging data, wherein
the controller is further configured to
  determine whether storing of the imaging data is necessary on the basis of the synchronized emotion data, and
  control the storage to store the imaging data on a basis of the determination.

8. The electronic apparatus according to claim 1, further comprising:
a storage that stores the imaging data, wherein
the controller is further configured to
  control the storage to store the imaging data, and
  perform data deletion or overwriting with the imaging data to be newly stored, on the imaging data stored in the storage for a portion in which a period being stored in the storage exceeds a predetermined period.

9. The electronic apparatus according to claim 1, wherein the controller is further configured to
  detect an amount and a direction of camera shake of a camera in the imaging data,
  determine a cut-out region in the imaging data in accordance with the amount and the direction of the camera shake that have been detected, and
  generate, on a basis of the determination, corrected imaging data in which the camera shake has been corrected.

10. The electronic apparatus according to claim 1, further comprising:
an attachment part configured to attach the electronic apparatus to a body.

11. The electronic apparatus according to claim 1, wherein
the imaging circuitry includes a plurality of imaging elements in which respective directions of optical axes are different from each other and which acquire respective pieces of specific-direction imaging data, and
the electronic processor is further configured to temporally synchronize, as the imaging data, the pieces of specific-direction imaging data obtained by the plurality of imaging elements with the emotion data.

12. The electronic apparatus according to claim 1, further comprising:
a wide angle lens, or
a fisheye lens,
wherein the incident light passes through the wide angle lens or the fisheye lens.

13. The electronic apparatus according to claim 1, further comprising:
a storage that stores reference data related to a subject, wherein
the controller is further configured to control the imaging circuitry on a basis of a matching result between the reference data and the imaging data.

14. The electronic apparatus according to claim 13, wherein the control of the imaging circuitry is performed on at least one of resolution, a frame rate, a bit length, an effect, or an active pixel region in the imaging circuitry.

15. The electronic apparatus according to claim 1, further comprising:
a storage that stores reference data related to an emotion, wherein
the controller is further configured to control the imaging circuitry on a basis of the reference data and the synchronized emotion data.

16. An imaging system comprising:
a storage that stores a delay time;
imaging circuitry configured to receive incident light and generate imaging data based on the incident light that is received;
an electronic processor configured to
  generate emotion data on a basis of acquisition data, and
  temporally synchronize the imaging data and the emotion data with each other to generate synchronized emotion data by temporally synchronizing the imaging data acquired at a first time point and the emotion data acquired at a second time point with each other, the second time point being later than the first time point by the delay time; and a controller configured to control one or more imaging parameters of the imaging circuitry on a basis of the synchronized emotion data.

17. The imaging system according to claim 16, further comprising:

a storage that stores reference data related to a subject, wherein the controller is further configured to control the imaging circuitry on a basis of a matching result between the reference data and the imaging data.

18. The imaging system according to claim 16, wherein the acquisition data includes measurement data related to at least one of a pulse, a heart rate, an electrocardiogram, an electromyography, a respiration, a perspiration, a GSR, a blood pressure, a degree of blood oxygen saturation, a skin surface temperature, an electroencephalogram, a blood flow change, a body temperature, a motion of a body, a motion of a head, a center of gravity, a rhythm of walking or running, an eye condition, or a surrounding sound.

19. The imaging system according to claim 16, wherein the controller is further configured to perform an evaluation on the imaging data on the basis of the synchronized emotion data, and control the imaging circuitry on a basis of a result of the evaluation.

* * * * *